H. BILGRAM.

Improvement in Steam-Engine Governors.

No. 133,192. Patented Nov. 19, 1872.

Hugo Bilgram
by his Attys.
Howson and Son

Witnesses.
Harry Smith
Thomas McIlvain

UNITED STATES PATENT OFFICE.

HUGO BILGRAM, OF PHILADELPHIA, PENNSYLVANIA.

IMPROVEMENT IN STEAM-ENGINE GOVERNORS.

Specification forming part of Letters Patent No. 133,192, dated November 19, 1872.

*To all whom it may concern:*

Be it known that I, HUGO BILGRAM, formerly of the Kingdom of Bavaria, but now of the city and county of Philadelphia, State of Pennsylvania, have invented an Improvement in Steam-Engine Governors, of which the following is a specification:

My invention has for its object the remedying of a defect in governors which act as a medium for directing the power of the engine to operate the throttle-valve or cut-off, the said defect being an over adjustment of the throttle or cut-off valve, in consequence of the adjusting devices remaining too long a time in gear with the actuating power.

Figure 1:
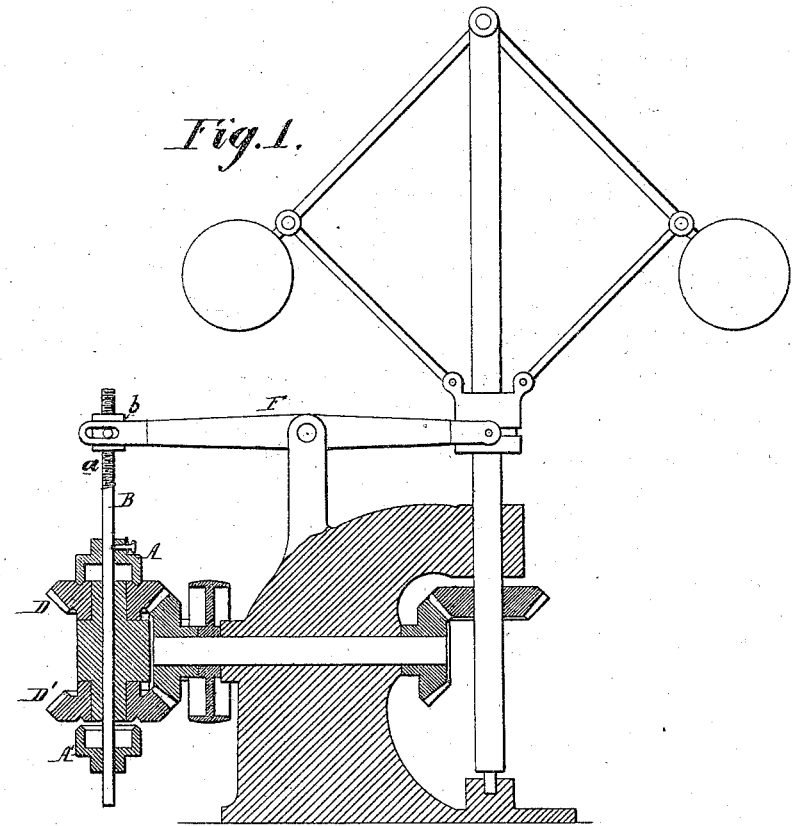

I accomplish this object by giving to the clutches A A', Figure 1, by which the valve-adjusting spindle B is thrown in and out of gear with the loose driving-wheels D and D', a self-acting disengaging tendency, by means of a screw-thread, $a$, adapted to a nut, $b$, on the governor-lever F, so that when the rising or falling motion of the governor-balls ceases, and the screw-spindle continues to rotate, the clutches will be disengaged by the longitudinal movement of the said screw-spindle through the nut, the rotary motion of the spindle, and consequently further adjustment of the engine-valve, instantly ceasing when the clutches are thus disengaged.

In ordinary indirect-acting governors the adjustment of the throttle or cut-off valve only ceases when the balls of the governor are in their middle position, the rising or falling of the balls throwing the operating devices into gear, and causing an adjustment of the valve, which is continued, whether the balls be still moving or at rest, until they again resume their original middle position. This over adjustment of the valve, in both opening and closing the same, produces irregularity in the speed of the engine, instead of correcting such irregularity.

When the governor-balls, Fig. 1, rise, the lever F will be so moved as to depress the nut $b$ and spindle B until the clutch A is brought in contact with bevel-wheel D. This will cause the said spindle B to be rotated in the same direction as the bevel-wheel, which rotation will have the effect of partially closing the throttle or cut-off valve connected to and controlled by the said spindle, and the adjustment of the valve will continue as long as the governor-balls are rising, but no longer, for as the spindle rotates it is at the same time screwed longitudinally through the nut $b$, so that the instant the governor-balls cease to rise and the said nut to descend the spindle will be elevated and its clutch A disengaged from the bevel-wheel, which will stop the rotation of the spindle, and consequently the adjustment of the valve. As long as the governor-balls remain at rest after having been thus raised there will be no further movement of the spindle or adjustment of the valve, but the instant the balls commence to descend, in consequence of a diminution of the speed of the engine, the nut $b$ and spindle will be elevated and the clutch A' thrown into gear with the loose bevel-wheel D'; this will cause a rotary movement of the spindle in a direction contrary to that before described, and a consequent opening of the valve, the spindle being in this instance screwed downward through the nut so that the clutch A' will be disengaged the instant the downward movement of the ball ceases.

In carrying out my invention toothed clutches may be used instead of friction-clutches, and they may be arranged on line with, instead of at one side of the governor-spindle, the connection in such case being preferably made through the medium of a yoke instead of a lever, and the threaded spindle to which the clutches are secured being adapted to a nut on the said yoke.

Figure 2:
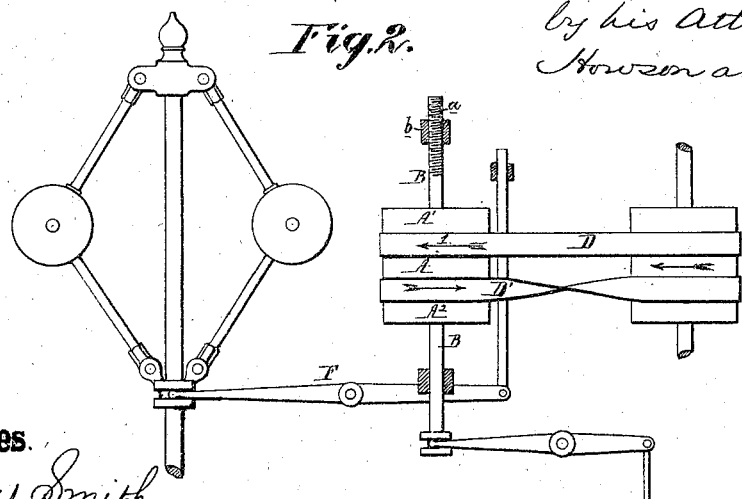

It is not essential, however, that clutches should be employed, as an arrangement of fast and loose pulleys, combined with the threaded spindle and nut in the manner illustrated in Fig. 2, will answer the purpose. In this modification the longitudinal movement of the screw-spindle B through the nut B is relied upon to operate the valve instead of its rotary movement, as with the clutches. A shifting of the straight belt D from the loose pulley A' to the fast pulley A, in consequence of the rising of the governor-balls, will cause a rotary movement of the spindle in the direction of the arrow 1, the said spindle being at the same time lowered through the nut, which will partially close the valve and disengage the pulley A from the belt D, which will be again shifted onto the loose pulley A'. A lowering of the balls will shift the crossed belt D' onto the fast pulley A, and, by turning the same and the spindle in the contrary direction, will screw the latter upward through the nut and disengage the pulley, thus again stopping the motion.

I claim as my invention—

A governor in which the clutches or other transmitters of motion to the valve-adjusting devices are thrown into gear with the actuating power by the rising-and-falling movement of the governor-balls, and in which, when the balls cease to rise or fall, the said transmitters of motion are immediately disengaged from the actuating devices through the medium of a screw receiving its motion from the said clutches or their equivalents, all substantially as specified.

In testimony whereof I have signed my name to this specification in the presence of two subscribing witnesses.

HUGO BILGRAM.

Witnesses:
  WM. A. STEEL,
  HARRY W. DOUTY.